Aug. 23, 1949.　　　　G. ROYSTON　　　　2,480,050
APPARATUS FOR DRYING CRYSTALLINE
OR GRANULAR MATERIALS
Filed July 6, 1948
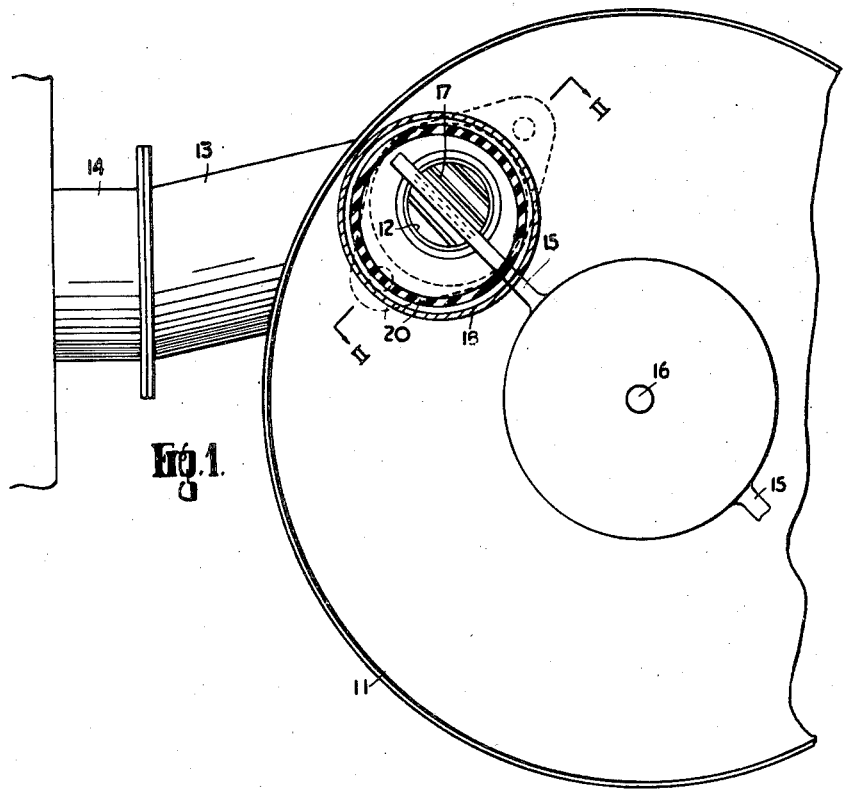
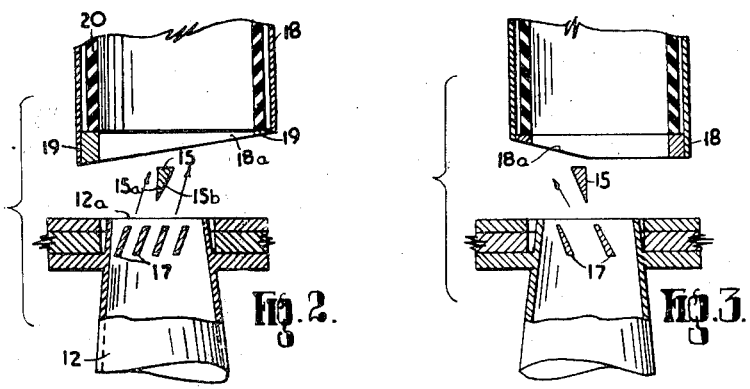
George Royston  INVENTOR
BY
S. Victor Armstrong  ATTORNEY Patented Aug. 23, 1949

2,480,050

UNITED STATES PATENT OFFICE 2,480,050

APPARATUS FOR DRYING CRYSTALLINE OR GRANULAR MATERIALS

George Royston, Barnsley, England

Application July 6, 1948, Serial No. 37,098
In Great Britain April 12, 1946

11 Claims. (Cl. 34—57)

This invention concerns the drying of granular and crystalline material such as ammonium sulphate.

In the specification of my application Serial Number 603,512 filed July 6, 1945, now Patent No. 2,444,406, issued June 29, 1948, there is disclosed an apparatus for drying granular crystalline material such as ammonium sulphate, such apparatus including a substantially horizontal plate having an orifice therein, means for blowing a current of conditioned gas upwardly through said orifice and means for displacing wet material across the surface of the plate to bring said material into contact with the upwardly moving gas current and an uptake pipe disposed above the orifice, said pipe to receive said material and gas.

Said specification also discloses such an apparatus in which the said means for displacing wet material comprises a rotary scraper mounted for rotation about an axis parallel with and laterally displaced from the axis of said orifice and having an arm displaceable over the surface of said plate and across said orifice and below the lower end of the uptake pipe.

The apparatus disclosed in said prior specification operates satisfactorily but the present invention seeks to increase its efficiency in various directions.

According to one feature of the present invention an arm or blade of the rotary scraper is of tapering, preferably triangular, cross section with its lesser thickness or triangular apex downwardly directed. It is preferably arranged so that its leading face is substantially vertical, the angle between its leading and trailing faces is preferably between 10° and 25°. By this feature of the invention less power is required for driving the rotary scraper as compared with a scraper having an arm or blade of the rectangular shape shown in the drawings of the said prior specification.

According to another feature of the invention an arm of a rotary scraper projects outwards in a generally radial direction from a boss or central portion of relatively large diameter, at least approximately equal to the length of said arm. By this feature power wastage due to accumulation of material near the scraper axis is avoided.

According to a further feature of the present invention there is disposed below the said orifice a plurality of baffles or louvres. Each baffle or louvre is preferably inclined to the axis of the orifices at an angle such that, when the arm or blade having an inclined trailing face passes thereover, the faces of said baffle or louvre lie approximately parallel to the said trailing face of the arm or blade. By this feature of the invention the conditioned gas moving upwardly is deflected by the baffles or louvres so that on reaching the arm or blade it is then moving in a direction generally parallel with the trailing face thereof. Furthermore, such baffles or louvres afford some support for the material to be dried and in consequence, a lower pressure or velocity of gas may be used to prevent the material falling down the orifice.

According to a still further feature of the invention the lower end portion of the uptake pipe terminates obliquely (as viewed along the arm or blade of the rotary scraper when said arm or blade is half way under said pipe). The oblique termination may extend completely across the pipe so that the said termination lies in a plane which may for example diverge by approximately 12° from a horizontal plane, or alternatively, said oblique termination may comprise only half or a part of the end of the pipe; in each case the angle of divergence may be about 24°. The oblique termination is preferably disposed so that the maximum clearance for the arm or blade is at the point where it first moves under said lower end portion, the minimum clearance, which is preferably such that the arm or blade almost makes contact with said lower end portion, being at the point where said arm or blade leaves the lower end portion of the uptake pipe.

Preferably the lower end portion of the uptake pipe is mounted so as to be slightly offset from the axis of the said orifice in such manner that when a current of gas emerges obliquely it is adequately enclosed by said lower end portion. There is preferably also provided within said lower end portion, which is conveniently of rigid material such as mild steel and preferably of diameter approximately twice that of the orifice, a pipe of somewhat smaller diameter which is conveniently of rubber or other flexible material.

The invention will be described further by way of example with reference to the accompanying drawings in which:

Fig. 1 is a fragmentary plan partially in horizontal section;

Fig. 2 is a fragmentary side vertical cross section on the line II—II of Fig. 1; and Fig. 3 is a view similar to Fig. 2 showing a lower end portion of the uptake pipe portion which is provided with a modified form of oblique termination.

Referring to Figs. 1 and 2, a substantially horizontal plate 11 has an orifice therein which is presented by an inner periphery 12a of a nozzle 12. Nozzle 12 is connected by way of a duct 13 to a source 14 of conditioned gas. Thus the nozzle, duct and source constitute a means for blowing a current of conditioned gas upwardly through said orifice.

A rotary scraper has two arms or blades 15, integrally formed on a central portion or boss fixed to a shaft 16. Each of these arms or blades is of triangular cross section having a downwardly directed apex, a substantially vertical leading face 15a and a trailing face 15b inclined at an angle of between about 10° and 19°.

Four inclined baffles or louvres 17 are disposed across nozzle 12 immediately below the orifice. The two faces of each of these baffles or louvres is arranged so as to be substantially parallel with a trailing face 15b of the rotary scraper arm or blade which is at the time passing above said baffle or louvre.

The scraper constitutes means for conveying the wet material across the surface of the plate to bring said material into contact with an upwardly moving current of gas from said orifice.

An uptake pipe having a lower end portion 18 of sheet metal is disposed above the orifice with its axis parallel to that of the said orifice. The amount of offsetting and the direction thereof is selected so that said lower end portion 18 adequately covers the current of gas after same has been deflected by the baffles or louvres and has passed the arm or blade of the rotary scraper.

Portion 18 has an oblique termination 18a extending entirely across the said lower end portion 18 and inclined at an angle of approximately 12° to the horizontal. Within said portion 18 there is disposed a mild steel ring 19 which is of varying length in order to terminate flush with termination 18a and which provides at its upper end a shoulder upon which rests the lower end of a rubber pipe 20. This rubber pipe is readily removable for cleaning purposes.

Referring to Fig. 3 there is shown a nozzle containing two, instead of four, baffles or louvres 17 and a lower end portion 18 of the uptake pipe having an inclined termination 18a extending only part way across said pipe portion.

I declare that what I claim is:

1. In an apparatus, for drying crystalline and granular material such as ammonium sulphate including a horizontal plate having an orifice therein, means to blow a current of gas upwardly through said orifice, and a rotary scraper for conveying wet material across said orifice; an uptake means disposed above said rotary scraper and comprising an uptake pipe having a lower end portion and a flexible pipe disposed within said lower end portion.

2. In an apparatus, for drying crystalline and granular material such as ammonium sulphate including a horizontal plate having an orifice therein, a rotary scraper composed of a hub portion and blade of tapering cross-section adapted to convey wet material across said orifice, a nozzle adapted to conduct a current of gas upwardly through said orifice and an uptake pipe above said rotary scraper in axial alignment with said orifice, the improvement comprising a plurality of baffles disposed in said nozzle below said orifice; the faces thereof being substantially parallel to the trailing face of said blade when positioned above said baffles.

3. In an apparatus for drying crystalline and granular material such as ammonium sulphate including a horizontal plate having an orifice therein, a plurality of baffles disposed below said orifice, means to blow a current of gas upwardly through said orifice past said baffles, and a rotary scraper adapted to convey wet material across said orifice, an uptake pipe disposed above said rotary scraper having a lower end termination inclined with respect to the plane of said horizontal plate.

4. The apparatus as set out in claim 3 wherein said inclined lower end termination extends completely across the end of said pipe.

5. The apparatus as set out in claim 4 wherein said lower end termination is inclined at an angle of approximately 12° with respect to the plane of said horizontal plate.

6. The apparatus as set out in claim 3 wherein said inclined lower end termination extends only part of the way across the end of said pipe.

7. The apparatus as set out in claim 6 wherein said lower end termination is inclined at an angle of approximately 24° with respect to the plane of said horizontal plate.

8. The apparatus as set out in claim 3 wherein maximum clearance between said rotary scraper and uptake pipe termination is at the point where said scraper first moves under said termination.

9. In an apparatus for drying crystalline and granular material such as ammonium sulphate including a horizontal plate having an orifice therein, a plurality of baffles disposed below said orifice, means to blow a current of gas upwardly through said orifice, and a rotary scraper adapted to convey wet material across said orifice; an uptake pipe positioned above said rotary scraper and slightly offset from the axis of said orifice in said horizontal plate so that the obliquely emergent current of gas from said orifice is adequately enclosed thereby.

10. The apparatus as set out in claim 9 wherein the diameter of the lower end portion of said uptake pipe is approximately twice that of the orifice in said horizontal plate.

11. In an apparatus for drying crystalline and granular material such as ammonium sulphate including a horizontal plate having an orifice therein and a nozzle adapted to conduct a current of gas upwardly through said orifice; the improvement comprising a rotary scraper adapted to convey wet material across said orifice, said rotary scraper having a hub portion and extending therefrom a blade of substantially triangular cross-section, one apex of said blade being directed downwardly; and cooperating with said scraper, a plurality of baffles disposed in said nozzle below said orifice, the faces of said baffles being substantially parallel to the trailing face of said blade when positioned above said baffles.

GEORGE ROYSTON.

REFERENCES CITED

The following references are of record in the file of this patent:

UNITED STATES PATENTS

| Number | Name | Date |
| --- | --- | --- |
| 316,353 | Free et al. | Apr. 21, 1885 |
| 1,019,958 | Hannam et al. | Mar. 12, 1912 |
| 1,550,992 | Trump | Aug. 25, 1925 |
| 2,440,406 | Royston | June 29, 1948 |